United States Patent [19]
Wurst

[11] 3,870,119
[45] Mar. 11, 1975

[54] AUXILIARY BRAKE CONTROL FOR AUTOMOTIVE VEHICLES PARTICULARLY HAVING AUTOMATIC TRANSMISSIONS

[75] Inventor: Bert Wurst, Stuttgart, Germany

[73] Assignee: Robert Bosch GmbH, Stuttgart, Germany

[22] Filed: July 5, 1973

[21] Appl. No.: 376,432

[30] Foreign Application Priority Data
July 27, 1972 Germany............................ 2236833

[52] U.S. Cl............. 180/77 R, 180/82 B, 192/3 TR
[51] Int. Cl................................................ B60l 7/12
[58] Field of Search... 180/82 B, 82 R, 77 R, 105 E; 192/3 TR; 310/168; 188/265

[56] References Cited
UNITED STATES PATENTS

| | | | |
|---|---|---|---|
| 2,323,208 | 6/1943 | Eaton................................ | 180/82 R |
| 2,489,929 | 11/1949 | Raybould.......................... | 180/82 R |
| 2,843,235 | 7/1958 | Weaver............................. | 192/3 TR |
| 3,233,153 | 2/1966 | Ryan ............................ | 180/82 B X |
| 3,426,872 | 2/1969 | Irie ................................ | 192/3 TR X |
| 3,482,130 | 12/1969 | Woodward....................... | 310/168 X |
| 3,492,518 | 1/1970 | Wayne.............................. | 310/168 X |
| 3,564,313 | 2/1971 | Goor................................. | 310/168 |
| 3,593,815 | 7/1971 | Inoue ............................... | 180/82 B |
| 3,645,352 | 2/1972 | Stark................................ | 180/82 R |
| 3,793,545 | 2/1974 | Leiber.............................. | 310/168 |

Primary Examiner—David Schonberg
Assistant Examiner—Terrance L. Siemens
Attorney, Agent, or Firm—Flynn & Frishauf

[57] ABSTRACT

To prevent creep, a mechanical-electrical transducer is coupled to the engine speed controller, for example the throttle, or the accelerator pedal, to sense idling, or non-operated condition; a motion-electrical signal transducer is coupled to the output of the transmission to sense stopped condition of the vehicle. A logic circuit has the outputs of the transducers applied thereto and provides a control output which is utilized to apply braking effort to the brakes of the vehicle so that the idling torque transmitted by an automatic transmission is counteracted in the vehicle held stopped. In a preferred form, vacuum from the engine is used as the operating force to control the brakes to hold the vehicle against the idling torque.

7 Claims, 14 Drawing Figures

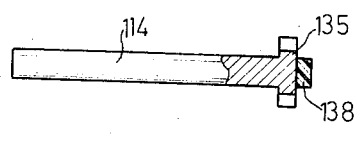
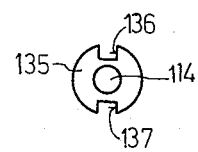
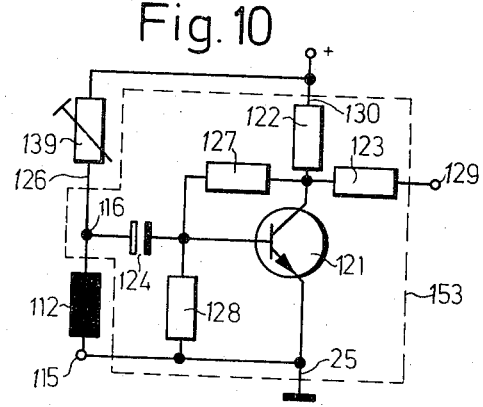
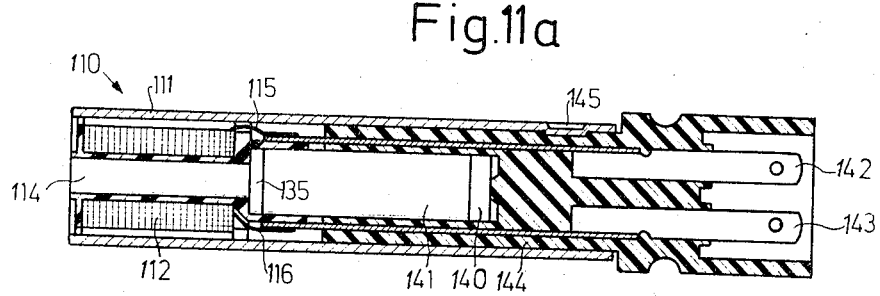
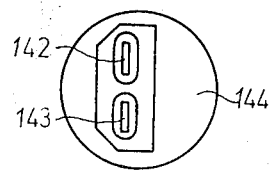

AUXILIARY BRAKE CONTROL FOR AUTOMOTIVE VEHICLES PARTICULARLY HAVING AUTOMATIC TRANSMISSIONS

CROSS REFERENCE TO RELATED APPLICATION

U.S. Ser. No. 374,306 filed June 28, 1973, assigned to the assignee of this application.

The present invention relates to a brake control system and more particularly to an arrangement to logically control the brakes of an automotive vehicle depending on the condition of the engine controller, for example the accelerator pedal, the throttle, or any other control element within the control chain of the engine, and sensed absence of motion of the vehicle, and more particularly to such a system for use with vehicles having automatic transmissions to prevent creep if the vehicle is to remain stopped.

Many automatic transmissions of automotive vehicles have torque converters. Such torque converters provide output torque also when the engine operates at idling speed. The output torque is low, but still sufficient to drive the vehicle, slowly; this is known as creep. Thus, if the operator is to hold the vehicle stopped on a level road surface, he must always hold the brake applied. This is particularly bothersome in start-stop traffic, during which repeated acceleration and stopping is experienced, resulting in the well known "accordion" effect. Only few operators change the speed setting of the selector lever of an automatic transmission to neutral after the vehicle has been stopped.

It is an object of the present invention to provide an automatic system in which the continued application of brake pressure, after the vehicle has been stopped, is eliminated.

SUBJECT MATTER OF THE PRESENT INVENTION

Briefly, a physical quantity is derived which is representative of the position of the throttle of the engine, or of the accelerator pedal, respectively (or any point in the control train for the throttle), to sense when the engine is controlled to operate at idling speed only; further, a second physical quantity, typically an electrical signal, is obtained which senses rotational speed at the output of the transmission. The two physical quantities are logically combined in the utilization arrangement which, in accordance with a feature of the invention, is connected to a magnetically operated valve to apply auxiliary braking effort to the brakes, so that, once the vehicle is stopped, it will be held stopped automatically.

The system of the present invention has the advantage that vehicles, particularly vehicles with automatic transmissions which include torque converters, are easier to control since the remaining idling torque of the automatic transmission is compensated by the auxiliary braking effort. Creep of the vehicle is thus avoided. The advantage of automatic transmissions that vehicles which are being started up an incline, will not roll back, is retained. The auxiliary braking effort in the braking system of the vehicle is only generated if the operator does not control the accelerator to provide engine power, and, simultaneously, the vehicle is not in motion. This system is so arranged that, therefore, undesired braking by the system is prevented.

The invention will be described by way of example with reference to the accompanying drawings, wherein:

FIG. 9a and FIG. 9b are longitudinal and end views of the core of FIG. 5;

FIG. 10 is a circuit diagram of the transducer of FIG. 5, with a preamplifier; and FIGS. 11a and 11b are longitudinal sectional and end views, respectively, of a modified embodiment, adapted to cooperate with a soft iron rotating element.

Figure 1:
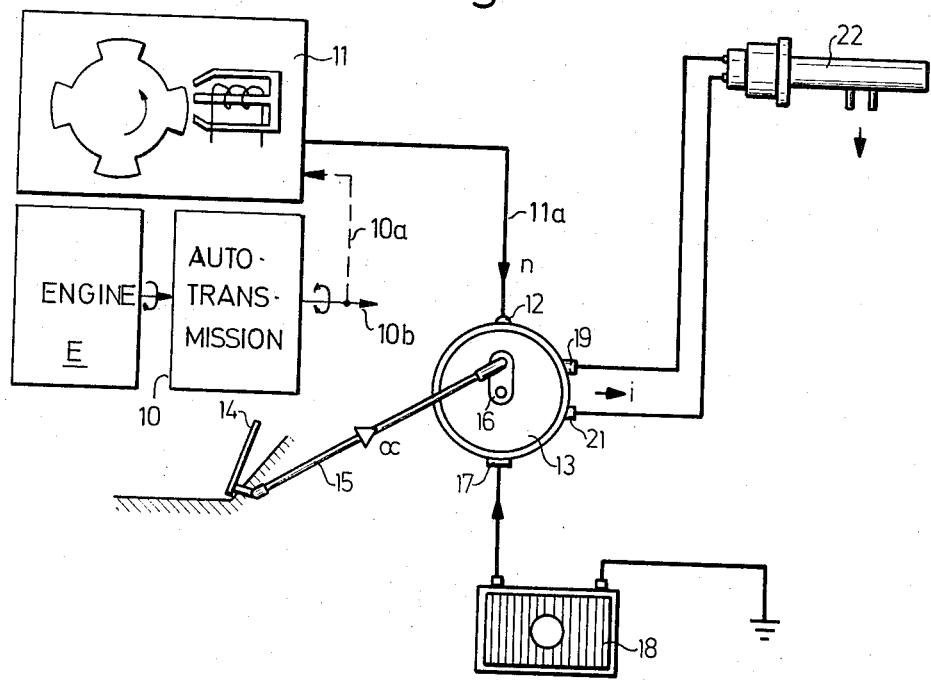
FIG. 1 is a highly schematic diagram of the system of the present invention.

An engine E drives an automatic transmission 10 in a predetermined dirction of rotation; the automatic transmission 10 has an output schematically indicated at 10b, which may be different in speed and rotation from that of the engine, as indicated by the double rotary arrow. The output of the transmission is coupled, as schematically indicated by dashed line 10a, to the rotary element of a tachometer-generator 11, providing a speed output signal. Element 11 is connected over line 11a to a first input 12 of a utilization device 13, preferably included within a single housing. An accelerator pedal 14 is connected over a linkage 15 to a second input 16 of utilization device 13, a terminal 17 of which is connected to battery 18. The two outputs 19, 21 of device 13 are connected to a magnetic valve 22.

Transducer 23 (FIG. 2) converts mechanical movement derived from accelerator 14, or any position within the control chain between accelerator 14 and the throttle of the engine to a variable electrical parameter, for example electrical resistance R. The output terminal of unit 23 is connected, as shown at 34, to a logic circuit 24 which may, for example, include an NAND-gate. Transducer 25, schematically shown within tachometer-generator 11 (FIG. 1) converts output speed $n$ to an output voltage U which is applied at terminal 47 to the second input of the gate of circuit 24. The output of logic gate 24 is connected to the input of an amplifier 26, the output current of which controls magnetic valve 22. The magnetic valve itself controls the fluid pressure within the braking system of the vehicle.

Figure 3:
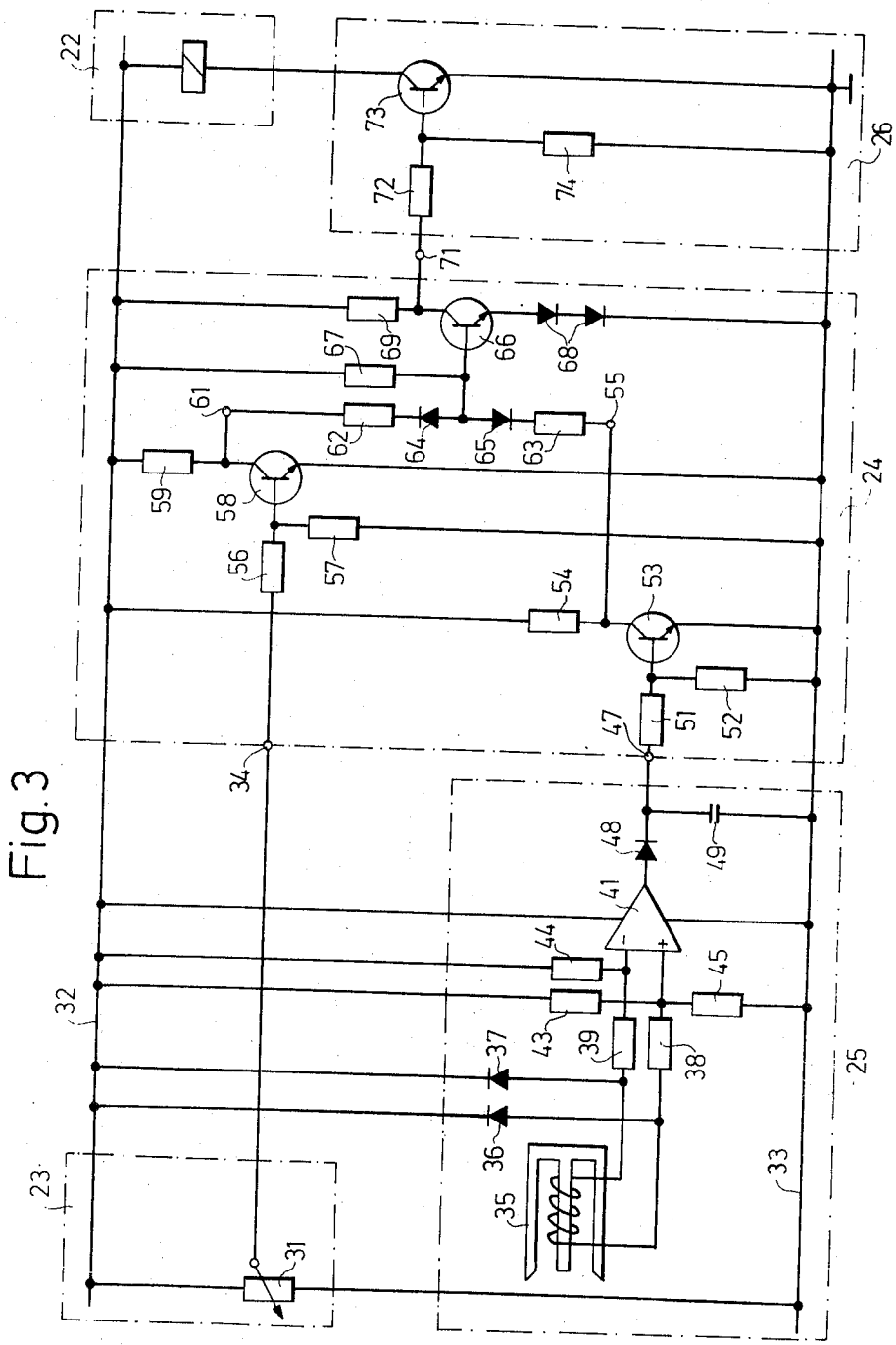
FIG. 3 is a simplified schematic circuit diagram of the system.

FIG. 3 illustrates the circuit in greater detail: transducer 23 includes a potentiometer 31 connected across positive and negative buses 32, 33. The slider of potentiometer 31 is connected mechanically to the control linkage for the throttle of the engine, and electrically to terminal 34. The setting is such that, when the engine is idling, the terminal 34 is practically at 0 or chassis potential of line 33. Transducer 25 includes an electromagnetic sensing transducer 35 which has a coil therein with two terminals. Diodes 36, 37 have their anodes connected to the terminals of the coil, their cathodes to positive bus 32. The coil terminals are further connected over coupling resistors 38, 39 to the noninverting and inverting input of an operational amplifier 41, connected as a differential amplifier. A noninverting input is further connected to a voltage divider, across buses 32, 33, and formed of resistors 43, 45. The inverting terminal is connected over resistor 44 to positive bus 32. The output of differential amplifier 41 is connected over a diode 48, a capacitor 49 between the diode output and negative bus 33 to terminal 47, forming the input of logic gate 24. A voltage divider formed of resistors 51, 52 connects between terminal 47 and negative bus or chassis 33; the tap point is connected to the base of a transistor 53, the emitter of which connects to the negative bus 33, and the collector over collector resistor 54 to positive bus 32. The collector is further connected to a function point forming a first addition point 55. Input terminal 34 of the logic gate 24 is connected to a voltage divider formed of resistors 56, 57, the tap or junction point of which connects to the base of a transistor 58, the emitter of which is connected to chassis 33 and the collector over collector resistor 59 to positive bus 32. The collector is further connected to a second addition point 61.

Each of the junction points 55, 61 have a series connection formed of a resistor 63, 62 respectively and a diode 65, 64 respectively connected to a common terminal which, in turn, connects to the base of a transistor 66, and further, over resistor 67 to positive bus 32. The emitter of transistor 66 is connected over diodes 68, preferably two in series, to chassis 33; the collector is connected over collector resistor 69 to positive bus 32, and further to output terminal 71 forming a third addition point, and simultaneously the input to amplifier 26. Amplifier 26 includes a coupling resistor 72 connected to the base of a transistor 73; resistor 74 connects between the base of transistor 73 and chassis. The emitter of transistor 73 is connected to chassis, and the collector through the coil, or solenoid of magnetic valve 22 to positive bus 32.

The elements of the circuits illustrated in FIG. 3, and their operation are generally known, and the further description will be restricted to the logical function. When the output speed of transmission is 0, then the output voltage of transducer 25 will be 0, so that the input voltage at the first terminal 47 of logic circuit 24 will likewise be 0. The different amplifier 41 of the transducer network will then switch the first input 47 of the logic circuit 24 to a predetermined positive value which differs substantially from 0. The output of difference amplifier 41 therefore is a binary type signal. When the motor is stopped, or rotates only at idling speed, the output voltage of the motor controller-voltage transducer is so set that the input voltage of the second input 34 of the logic circuit 24 is at the level of negative bus 33. If, however, the speed of the motor increases with respect to idling speed, the second input 34 of logic circuit will have a voltage which is between that of negative bus 33 and positive bus 32. The relationship between the output speed of the transmission 10, sensed by transducer 25, and the position of the engine controller (throttle opening or accelerator position) resulting in a throttle opening angle α, and the braking effect caused by solenoid 22 can now be determined. If the engine controller is operated, and the speed at the output of the transmission is greater than 0, then the voltages at the first addition point 55 and at the second addition point 61 are both positive. The voltage at the third addition point will be negative, and value 22 is not operated, since transistor 73 will block. If the voltage at the transmission output indicates a transmission speed of 0, and the engine controller is in non-operated condition (engine stopped or at idling speed) then the voltages at the first addition point 55 and at the second addition point 61 are both substantially less than the positive supply bus voltage; third transistor 66 is blocked, and its collector potential, as well as the potential of the third addition point 71, becomes positive. Fourth transistor 73 is now controlled to be in conductive state, and valve 22 is energized, that is, operated. Braking pressure in the braking system of the vehicle is increased. If the output speed of the transmission is 0 and the engine controller is operated; or if the engine controller is in 0 position (idling speed) and the engine output speed is not 0, then only one of the two addition points 55, 61 will have a positive voltage, and the third addition point 71 will have a low voltage thereon. In both cases, the magnetic valve 22 is not energized, and no auxiliary braking effort is exerted.

The operator pedal 14 is connected mechanically with the throttle of the motor; any position of the accelerator pedal, therefore, has a definite corresponding position of the throttle. The pedal 14, shown in FIG. 1, may just as well also represent the throttle. The term "engine speed controller" therefore, as used in the present specification may mean any element within the operator controlled speed or power control system of the engine.

Figure 4:
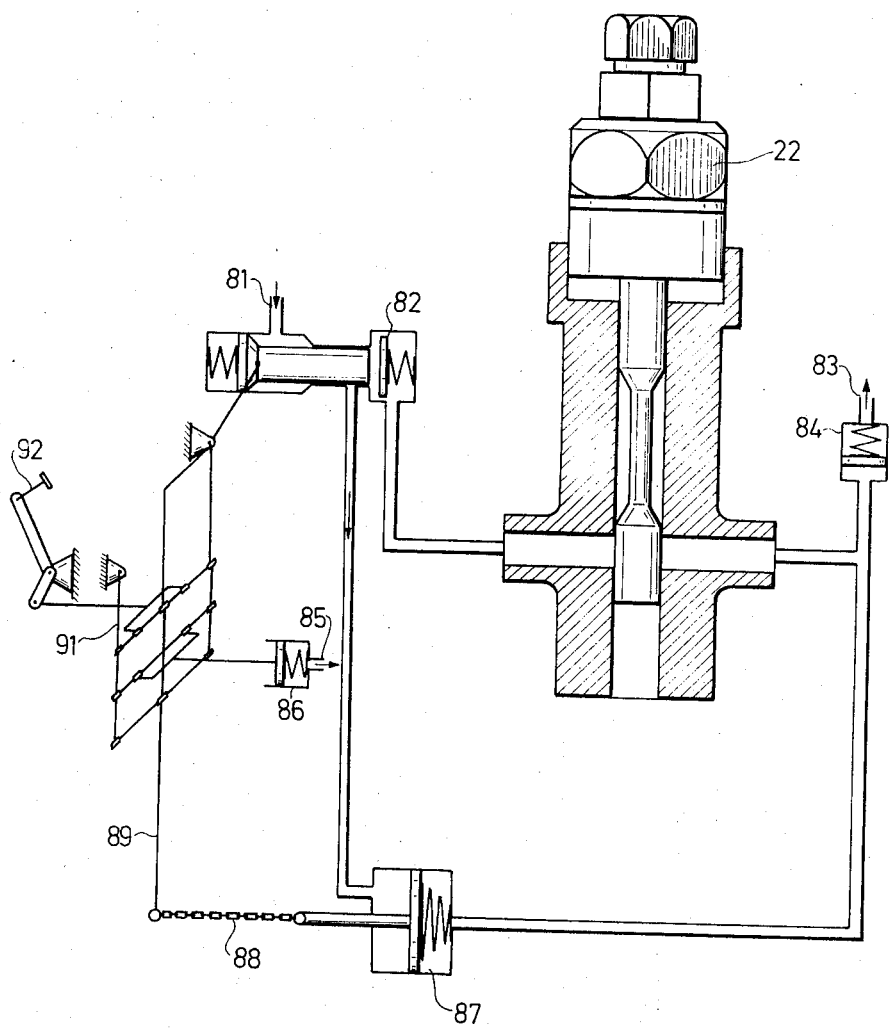
FIG. 4 is a schematic, simplified diagram of a vacuum power braking system.

The system of the present invention may be used with various types of braking systems. FIG. 4 illustrates, in fragmentary representation, a vacuum power brake system, including the electromagnetically operated valve 22.

A duct 81 is connected to ambient atmosphere, to lead ambient air into a control valve 82. A vacuum line 83 is connected over a check valve 84 to the suction, or vacuum point of an engine, or pump, not shown. A hydraulic master cylinder 86 is connected over lines 85 to the various wheel brake cylinders, not shown. A position of the piston of a brake cylinder 87 can be influenced, from one side, by vacuum in the vacuum line 83 and, on the other side, from the pressure in a line connected to the control valve 82. The valve 22, included in this line, influences the pressure relationship. The piston of the brake cylinder 87 is connected over a cable, chain, or other similar connection 88 with a balance lever 89. Balance lever 89 cooperates with a linkage 91, which determines the base position of the brake pedal 92. FIG. 4 illustrates the position in which the valve 22 is closed and braking effort is exerted. Vacuum is applied over line 83, through the right side of the brake cylinder 87, the left side thereof being connected to ambient air through the valve 82 and line 81. Feedback to the brake pedal 92 is provided and the operator will notice that the automatic system has responded. If the operator depresses the accelerator pedal to move the vehicle, valve 22 will be de-energized, moved downwardly (FIG. 4) under spring pressure and any vacuum from line 83 will be bypassed through the valve 22, not causing any effect on the brake cylinder 87. Likewise, brake pedal 92 will revert to its normal position.

Figure 5:
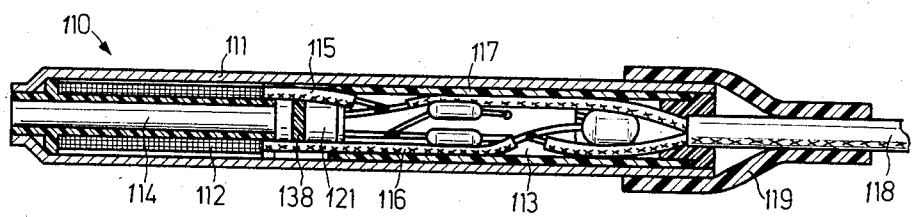
FIG. 5 is a longitudinal sectional view through an inductive transducer, adapted to cooperate with a rotating element of the vehicle, when the vehicle is in motion, which includes preferably a magnetic element.

FIG. 5 illustrates an inductive transducer 110, having a soft iron sleeve or housing 111, which includes, essentially, a coil 112 and a circuit board 113 therein. Coil 112 has a soft iron core 114 inserted therein. The first terminal end 115, and the second terminal end 116 of coil 112 are connected to respective terminals on circuit board 113. Circuit board 113 is insulated from the soft iron housing 111 by an insulating tube 117. A cable 118 connects from board 113 to the logic circuit 24 (FIG. 2). A sealing nipple 119 seals the soft iron tube 111 to the cable 118. The entire assembly of the inductive transducer is brought into proximity to the toothed wheel, or disk (FIG. 1) coupled to the output of the transmission. Any rotation of the toothed wheel will change the magnetic reluctance path between the outer soft iron sleeve 111, and the core 114, thus inducing a voltage in coil 112.

The details of the assembly of the core are shown in FIGS. 6a, 6b, FIG. 7, 8, 9a, 9b; the circuit diagram which includes a preamplifier is shown in FIG. 10.

Figure 6A:
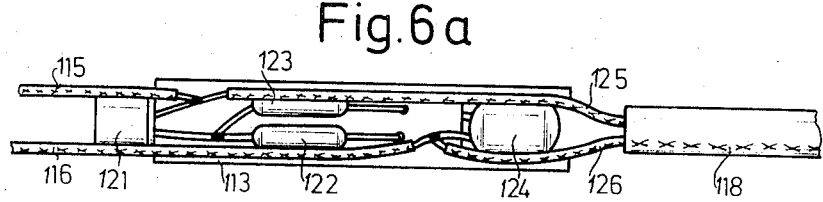
FIG. 6a and 6b are front and rear views of the circuit board of the transducer of FIG. 5.
Figure 6B:
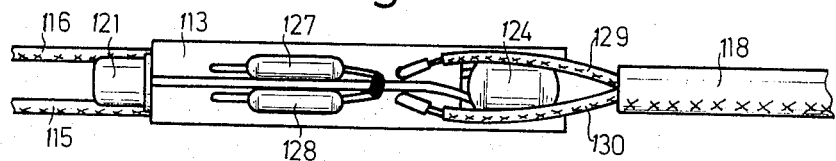

The terminals 115, 116 of coil 112 are brought out to one side of circuit board 113. A transistor 121 is located at the end of the circuit board. The same side of the circuit board further carries a collector resistor 122 (FIG. 6a, FIG. 10) and a coupling resistor 123. A capacitor 124 is located in a notch punched into plate 113. The output from the circuit board is a ground terminal 125, an auxiliary line 126 (FIG. 10) adapted for connection to an adjustable resistor 139, and, connected to the other side, output line 129 and positive supply 130. The other side of the circuit board 113 includes the collector base resistor 127, and a base emitter resistor 128 (FIG. 6b). Capacitor 124 is also visible on the other side, fitted in its notch.

Figure 7:
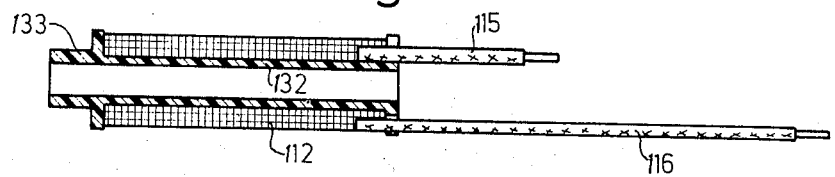
FIG. 7 is a section through the coil of FIG. 5.
Figure 8:
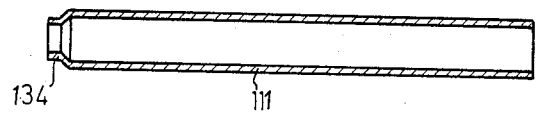
FIG. 8 is a section through the outer sleeve of FIG. 5.

The coil is separately shown in FIG. 7, wound on a coil spool body 132 which, at the side remote from the plate 113 is formed with a sleeve-like extension 33. The outer surrounding soft iron housing or sleeve 111 is seen in FIG. 8. It is cylindrical, and formed with an end of reduced diameter 134. The reduced diameter end 134 fits snugly on the extension 133 of the coil form 132. The soft iron core is seen in FIG. 9a, in longitudinal section and in an end view in FIG. 9b. At the side facing the cable 118, core 114 is formed with a flat head, having an outer diameter equal to the inner diameter of the soft iron housing 111, to form a magnetic coupling between the soft iron core 114 and the outer housing 111. The flat head is formed with two notches 136, 137 to permit passage of the coil connecting wires 115, 116. An insulating disk 138 is secured to the end of the head 135 to electrically insulate the housing of transistor 121 from the core 114, insulating sleeve 132, and housing 111 terminate in a sealed end having a flush smooth surface.

The circuit diagram of FIG. 10 is a standard circuit including a preamplifier transistor 121, to which coil 112 is coupled by means of capacitor 124. Auxiliary line 126 connects an adjustable resistor 139 to positive supply 130.

To connect a sensor as describe in connection with FIGS. 6-10 into the circuit of FIG. 3, minor modifications are necessary in the connection of the operational amplifier 41, since one side of the coil, together with its preamplifier is grounded. Terminal 129 would be connected, as in FIG. 3, to the inverting terminal of the operational amplifier, and resistor 38 and diode 36, connected to the noninverting input can be omitted. The operational amplifier then will sense any voltage transmitted over coupling resistor 123 to terminal 129, which can be coupled directly to the inverting input of the operational amplifier 41, connecting diode 37 in series therewith, or, as shown, between the inverting input of the operational amplifier and positive bus 32, with or without a further resistor 39.

An inductive transducer, to cooperate with a movable disk or wheel to provide an output voltage indicative of motion, or non-motion of the output of the transmission, in modified form, is shown in FIG. 11, in which like parts have been given like reference numerals and will not be explained again. The head 135 of a soft iron core 114 is magnetically biased by a permanent magnet 141. The magnetic circuit is closed to the soft iron housing 111 by a soft iron bridge 140 located behind the permanent magnet 141. Soft iron core 114 thus is pre-magnetized by the permanent magnet 141, and the coil 112 need not be pre-magnetized. The inductive transducer, in accordance with FIG. 11 does not require a preamplifier. Terminals 115, 116 of the coil 112 directly connect to a pair of contact flags 142, 143, to which a supply cable can be connected. Flags 142, 143 are secured in an insulating bushing 144, in which the permanent magnet 141 is also secured. Soft iron housing 111 is deformed, as schematically shown at 145, in order to secure it to the insulating bushing 144. The end face of the transducer of FIG. 11a is seen in FIG. 11b.

Various changes and modifications may be made within the scope of the inventive concept.

The invention has been described as providing an output signal to the control valve 22 when the logical conjunction of engine speed and drive train rotation indicates 0. It is also possible to so construct the system that the valve 22 is normally energized, that is, normally does not apply auxiliary braking pressure, but, upon logical conjunction of said signals, the valve becomes deenergized to shift in the position shown in FIG. 4, for example under spring pressure. The only change in the circuit which would be necessary is to include an inverter stage in combination with the amplifier 26.

Figure 2:
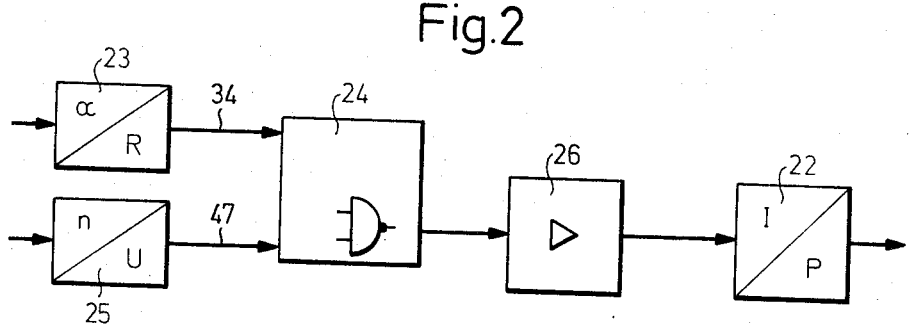
FIG. 2 is a block diagram of the electrical portion of the present invention.

The output from the transmission can be sensed not only at he output point of the transmission, as schematically shown in FIG. 1, but may also be taken from one, or all the wheels. For example, an indication as to whether the vehicle is moving can be obtained from sensors associated with various wheels of the vehicle, which may already be provided for example as part of a brake anti-lock system. Some brake anti-lock systems provide wheel circumferential speed-vehicle speed comparator circuits, in which rotational speed signals of all wheels are connected to a "greater than" circuit, so that, if any one of the wheels is rotating, an output will be available indicative of vehicle speed. The voltage obtained from such a circuit can be utilized to form an output signal applied to the circuit 25 as an indication that the vehicle is not stopped, to be logically combined in circuit 24 with a further control signal indicative that the engine is idling, or, at least, is not controlled by the operator to be above idling speed. The sensor may also be associated with other points in the drive train of the vehicle; the brake control itself (FIG. 4) can be applied as auxiliary cylinders to the wheels, or to selected ones of the wheels (for example only the rear wheels) or to other points in the drive train of the vehicle, for example at the output of the transmission.

I claim:

1. Auxiliary braking control apparatus for automotive vehicles, particularly having automatic transmissions, to derive a control signal indicative of
  a. position of engine speed controller (14) and
  b. vehicle motion,
  comprising
  a potentiometer (31) coupled to the engine speed controller (14) and changing slider position representative of engine speed controller position, the slider on the potentiometer (31) and the engine speed controller (14) being so connected that the output voltage from the slider of the potentiometer is essentially zero when the motor is controlled to operate at its idling speed condition, and increases proportionately as the motor speed controller (14) is operated to increase motor speed above idle, to provide an engine control electrical signal representative of position ($\alpha$) of the engine speed controller (14);
  a tachometer generator (11; FIGS. 6-11) having a rotating element mechanically coupled with the output from the transmission of the automotive vehicle to provide a vehicle motion signal;
  a difference amplifier (25) connected to the tachometer generator (11), said difference amplifier comparing the vehicle motion signal with a reference, and providing an output which is 0 when the vehicle motion signal representative of speed of a rotating element within the drive train is essentially 0, and further providing an output which is substantially different from 0 if the output of a rotating element coupled to the drive train is not 0, to provide a 0–1 binary type vehicle motion signal;
  and logic means (13, 24) having said engine signal and said binary type motion signal applied thereto and providing a control output indicative of the logical conjunction of:
  i. engine controller set to operate the engine at idling speed; and
  ii. no vehicle motion.

2. Apparatus according to claim 1 wherein said vehicle has a brake system; a brake controller is provided, and said control output is connected to the brake controller to apply braking force upon presence of said output only.

3. Apparatus according to claim 2 wherein the brake controller includes an electromagnetic valve connected to and controlled by the output of said logic means, and permitting application of fluid under differential pressure to said brake system;
  said valve being controlled by the control output from said logic means.

4. Apparatus according to claim 3 wherein the vehicle brake system includes a master cylinder, and the magnetic valve is included in the fluid control circuit of said master cylinder.

5. Apparatus according to claim 1 wherein a single housing (13) is provided including said potentiometer and said logic means.

6. Apparatus according to claim 1 wherein said tachometer generator has a rotating element with salient projections thereon;
  a coil (112) having an outer soft-iron cover (111) in form of a sleeve surrounding said coil (112) and a core in the center of the coil (114);
  an insulating sleeve separating the outer sleeve and the core, and the coil therebetween;
  the outer sleeve, the insulating sleeve, and the core terminating in form of a flush end plug and being tightly secured together, to prevent contamination of the coil, and to hold coil, core, and sleeve together in a unitary assembly having a smooth end surface.

7. Apparatus according to claim 1 wherein said vehicle includes a braking system, having a brake cylinder (87) and a piston therein, the piston acting on a rotating element within the drive train of the vehicle;
  a vacuum connection to the inlet manifold of the engine, and connected to operate said piston in said cylinder;
  and an electromagnetically controlled valve, controlling application of vacuum to said cylinder, and hence said piston, said electromagnetically operated valve being controlled by the output from said logic means.

* * * * *